United States Patent [19]
Yokoyama et al.

[11] Patent Number: 4,989,573
[45] Date of Patent: Feb. 5, 1991

[54] GAS POWERED ENGINE WITH GLOW PLUG IGNITION

[75] Inventors: Yoshiharu Yokoyama; Shigeru Akiyama; Tsuyoshi Kamiya, all of Iwata, Japan

[73] Assignee: Yamaha Hatsudoki Kabushiki Kaisha, Iwata, Japan

[21] Appl. No.: 377,479

[22] Filed: Jul. 10, 1989

[30] Foreign Application Priority Data

Jul. 11, 1988 [JP] Japan ............................. 63-170867
Jul. 12, 1988 [JP] Japan ............................. 63-171805

[51] Int. Cl.$^5$ ............................................. F02B 77/00
[52] U.S. Cl. ................................. 123/527; 123/179 H; 123/198 DB
[58] Field of Search ........ 123/179 B, 179 H, 179 BG, 123/525, 527, 575, 576, 577, 145 A, 333, 198 DB, 276 E, 529

[56] References Cited

U.S. PATENT DOCUMENTS

| | | | |
|---|---|---|---|
| 4,433,664 | 2/1984 | Rodrigues | 123/529 |
| 4,444,160 | 4/1984 | Steele | 123/179 H |
| 4,483,302 | 11/1984 | Mannessen | 123/529 |
| 4,603,674 | 8/1986 | Tanaka | 123/575 |
| 4,658,772 | 4/1987 | Auth et al. | 123/179 H |
| 4,677,944 | 7/1987 | Nishimura et al. | 123/575 |
| 4,696,278 | 9/1987 | Ito et al. | 123/527 |
| 4,721,078 | 1/1988 | Watanabe et al. | 123/198 DB |
| 4,726,333 | 2/1988 | Verheyen | 123/179 H |

*Primary Examiner*—E. Rollins Cross
*Attorney, Agent, or Firm*—Ernest A. Beutler

[57] ABSTRACT

A fuel supply and glow plug arrangement for a portable electrical power supply fueled by a gaseous fuel internal combustion engine. The gaseous fuel flow to the engine is controlled by a solenoid valve having its duty cycle varied to vary engine speed. In addition, the solenoid valve is shut off when the engine speed falls below a predetermined speed so as to prevent fuel leakage. The engine is fired by a flow plug which is supplied with power at a high power level during cranking and at a lower power level during running.

14 Claims, 6 Drawing Sheets

GAS POWERED ENGINE WITH GLOW PLUG IGNITION

BACKGROUND OF THE INVENTION

This invention relates to a gas powered engine with glow plug ignition and more particularly to an improved arrangement for controlling the flow of gas to the engine and the heating of its glow plug.

There is a wide application for small internal combustion engines that are powered by gaseous fuel (LPG). Such engines may be utilized for a wide variety of purposes, for example, for small electrical powered generators. The use of gaseous fuel has a number of advantages but also presents certain difficulties. For example, it is one practice to supply the fuel to the engine at approximately atmospheric pressure. The fuel is then drawn into the engine through the negative pressure that exists in the induction system on the intake stroke. Although this arrangement has some advantages, it also may not always insure that an appropriate amount of fuel is inducted into the engine for its smooth running.

In order to avoid the aforenoted difficulties, there are advantages if the fuel is supplied to the engine at a slightly than greater atmospheric pressure. For example, if the fuel is supplied at relatively low gauge pressure (such as 0.04 kg/cm$^2$) then the engine may operate more satisfactorily. However, when the engine is stopped or slowed significantly, this greater than atmospheric fuel pressure may cause excess fuel consumption.

It is, therefore, a principal object of this invention to provide an improved gaseous fuel supplying system for an internal combustion engine.

It is a further object of this invention to provide a gaseous fuel supply system for an internal combustion engine that operates at greater than atmospheric pressures and which will insure that the supply of fuel is discontinued when the engine stops or slows below a certain speed.

In order to maintain simplicity for the engines operated on gaseous fuel, it is practical to employ a glow plug for cold starting. Although glow plugs are effective in cold starting, it may be necessary with gaseous fuels to provide an additional amount of heat to the glow plug even during engine running. This will insure good combustion. However, if the glow plug is applied with the same current or heat during running as during starting, its life will seriously deteriorate.

It is, therefore, a still further object of this invention to provide an improved glow plug and control arrangement for an internal combustion engine.

SUMMARY OF THE INVENTION

A first feature of this invention is adapted to be embodied in a fuel supply circuit for a gas powered internal combustion engine comprising a source of pressurized gaseous fuel. Conduit means supply fuel from the source to the engine and means are provided for discontinuing the supply of fuel from the source to the engine when the speed of the engine falls below a predetermined value.

Another feature of the invention is also adapted to be embodied in an internal combustion engine having a glow plug ignition system. In accordance with this feature of the invention, the glow plug is provided with a higher degree of power during starting and the power to the glow plug is continued but at a reduced rate after the engine has started.

BRIEF DESCRIPTION OF THE DRAWINGS

FIG. 2 is a partially schematic view showing the components of the power suppy and their interrelationship.

DETAILED DESCRIPTION OF THE PREFERRED EMBODIMENT

Figure 1:
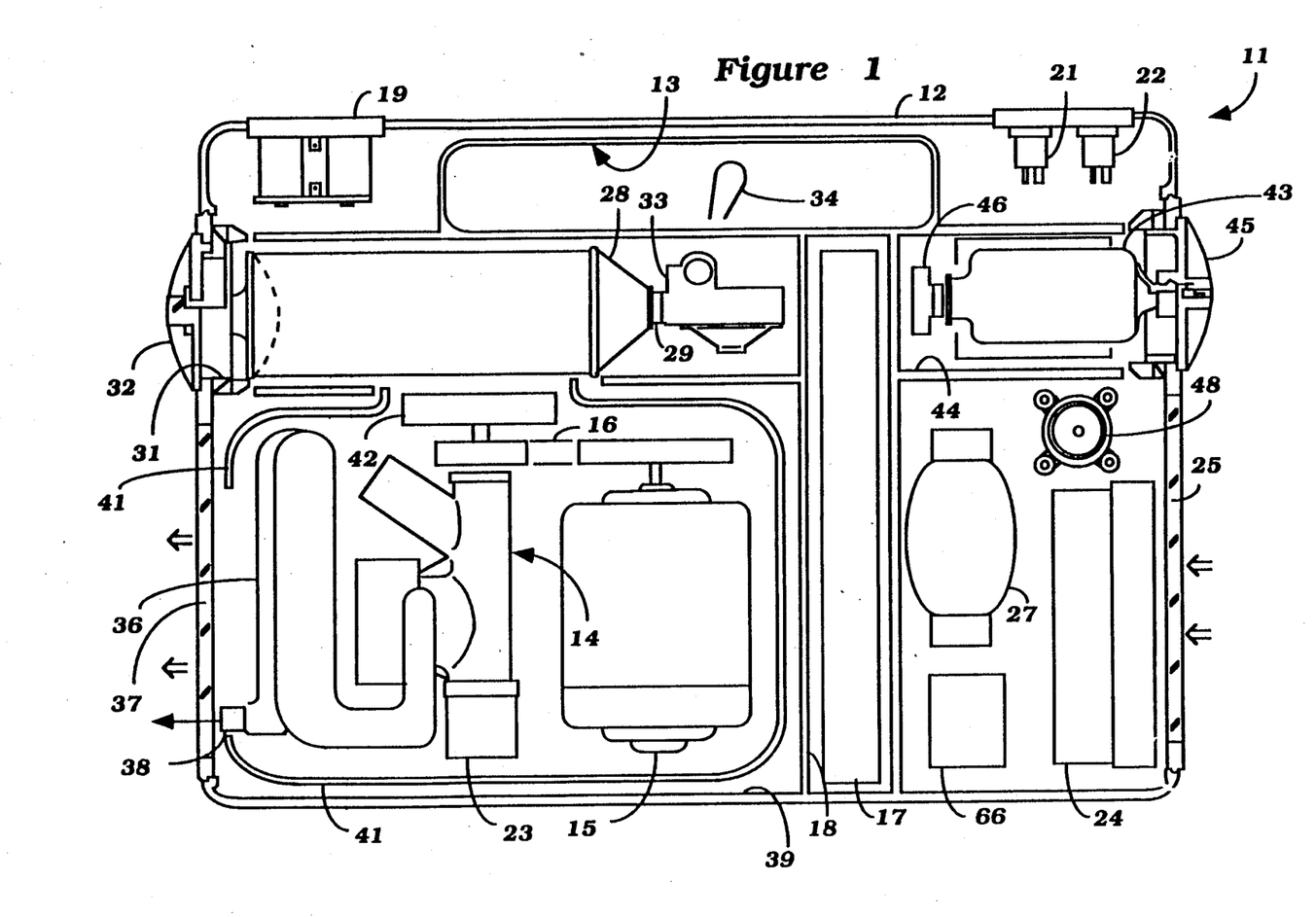
FIG. 1 is a cross-sectional view taken through a portable power supply constructed in accordance with an embodiment of the invention.

Referring first primarily to FIGS. 1 and 2, a compact portable electric power supply constructed in accordance with an embodiment of the invention is identified generally by the reference numeral 11. The invention is described in conjunction with a portable power supply since such devices advantageously run on LPG fuel. However, it is to be understood that the invention can be utilized in other applications wherein an internal combustion engine is supplied with a liquefied gaseous fuel and the fuel is supplied to the engine in gaseous form.

The power unit 11 is comprised of an outer housing, indicated generally by the reference numeral 12, and which contains all of the components of the power supply. The outer housing 12 may be formed from any suitable material such as a molded plastic and is formed with a carrying handle 13 formed by an opening at its upper end.

Contained with the outer housing 12 is a single cylinder, liquid cooled, small displacement internal combustion engine, indicated generally by the reference numeral 14. In the illustrated embodiment, the engine 14 is operated under the two-stroke, crankcase compression principle, however, it should be readily apparent to those skilled in the art that the engine 14 may be a four-stroke cycle engine and may have other than a single cylinder and, in fact, may be a rotary or other type of engine than a reciprocating engine.

The engine 14 has its output shaft connected to a shaft of a combined starter and generator 15 by means of a driving belt 16. The starter, generator 15 is coupled with an electrical circuit that includes a vertically positioned battery 17 contained within a compartment 18 formed by the outer housing 12. This circuit permits the starter, generator 15 to operate as a starter so as to start the engine 14. Once the engine 14 commences running, the starter, generator 15 will operate as a generator and supply a charge to the battery 17 and also provide an electrical output to a receptacle 19 carried adjacent the handle 13 so as to permit an electrical device to be plugged in and powered by the unit 11.

There is provided adjacent the handle 13 on the side opposite the receptacle 19 a main control switch 21 for switching the power on and off and a starter switch 22 for operating the starter, generator 15 in its starter mode.

The engine 14 is further provided with a cooling system that includes a coolant pump 23 that is driven by the engine 14 and which circulates coolant through a cooling jacket of the engine and a heat exchanging radiator 24. The radiator 24 is juxtaposed to an air inlet opening 25 formed at one side of the housing 12. There is further provided an electric fan 26 that is powered by the battery 17 and which circulates the air across the core of the radiator 24. The cooling system also includes an accumulator type pressure control device 27 which is comprised generally of a expansible hose section so as to compensate for volume differences in the coolant of the engine 14 as occur during engine operation.

The engine 14 is fueled by a pressurized source of gaseous fuel (LPG) that is contained within a removable container 28 that is detachably connected to a receptacle 29 immediately beneath the handle portion 13. The container 28 is placed into the receptacle 29 through an opening 31 formed at one side of the housing 12 and which opening is normally closed by a closure plug 32.

The receptacle 29 is coupled to a main shutoff valve 33 having a control handle 34 so as to permit the supply of fuel from the container 28 to be shut off from the remainder of the fuel supply circuit for the engine when the power supply 11 is not being utilized.

A conduit connects the main shutoff valve 33 with a duty solenoid valve 35 which controls the flow of fuel to the induction system of the engine 14 in a manner to be described.

The engine 14 further includes an exhaust system that is comprised of a muffler 36 that is juxtaposed to an air outlet opening 37 which is formed at the side of the housing 12 opposite the inlet opening 25. Air which has passed across the engine will then exit from the air outlet opening 37 so as to cool the muffler 36. The muffler 36 also has a discharge opening 38 which registers with the opening 37 for discharge of exhaust gases from within the housing 12.

The engine 14 and generator 15 are contained within a main cavity 39 formed by the outer housing 22 and are surrounded by a protective shield 41 for further heat insulation and ducting. An engine driven fan 42 circulates air from within the housing 12 across the engine 14, muffler 36 and out the opening 37.

The engine 14 is also provided with a lubricating system that receives lubricant from a separate lubricant container 43 that is received within a compartment 44 formed in the outer housing 12 and which is closed by a removable closure plug 45. The lubricant container 43 is of the cartridge type and is connected to a receiver 46 that supplies lubricant to the engine induction system through a conduit, shown schematically at 47 and in which a lubricant control pump 48 is positioned having a construction as described in copending application entitled "Compact Power Supply And Lubricant Affording Device Therefore", Ser. No. 377,480, filed July 10, 1989, and assigned to the assignee of this application. The lubricant pump 48 is designed so as to provide a positive flow of lubricant and also will in effect close the conduit 47 when the engine is not running so that lubricant cannot inadvertently flow from the reservoir 43 to the engine 14. The pump 48 also meters a very small amount of lubricant so as to insure very good lubrication for the engine under all running conditions and to avoid excess lubricant flow and consumption.

Figure 3:
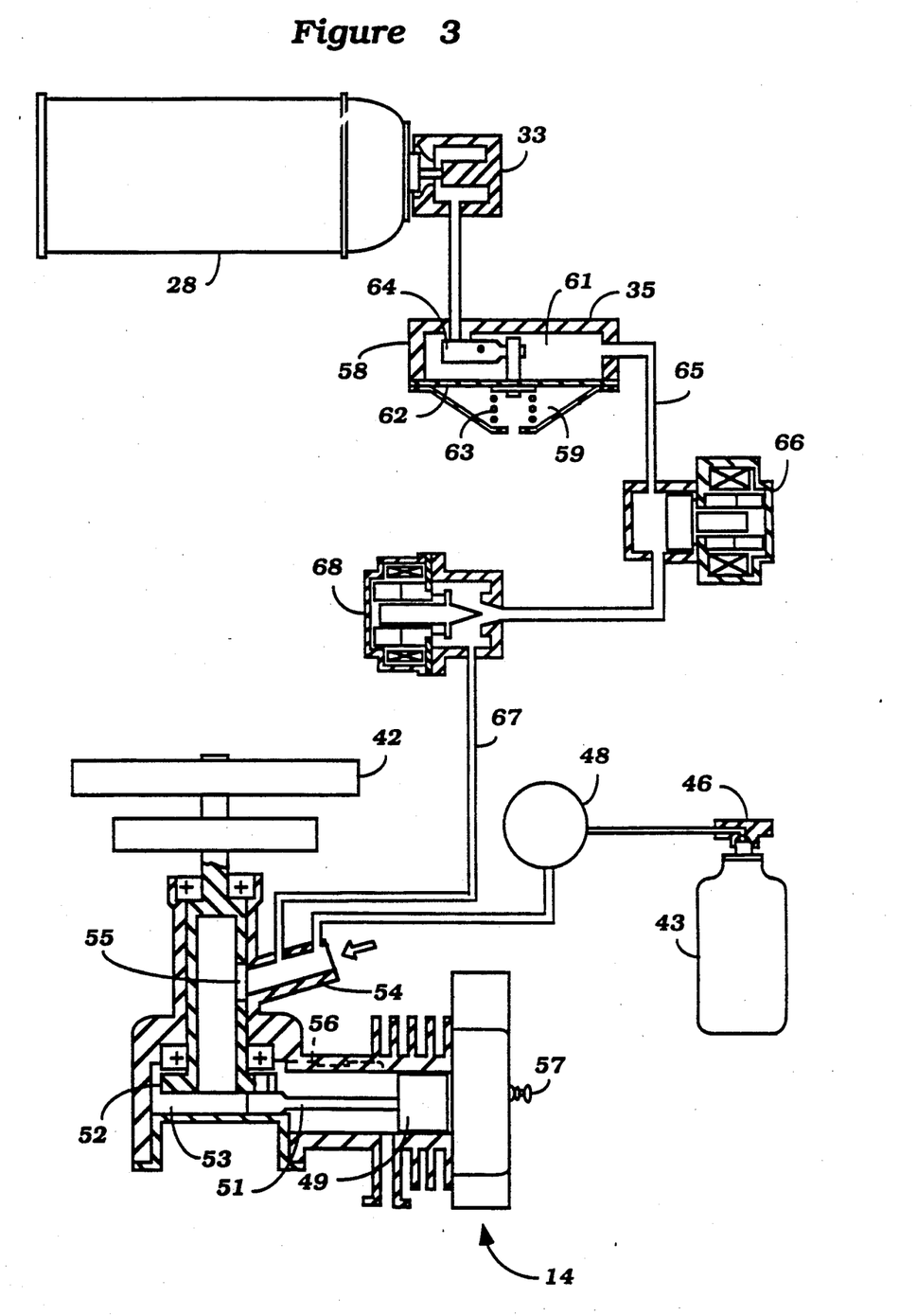
FIG. 3 is a schematic view, in part similar to FIG. 2, with portions shown in cross-section and shows more details of the fuel feed system and lubricant feed system for the engine.

FIG. 3 shows in more detail the fuel supply system for the engine 14 and also some details of the construction of the engine 14. Referring now to this figure, it will be seen that the engine 14 is of the single cylinder, crankcase compression type and includes a single reciprocating piston 49 that is connected by means of a connecting rod 51 to a crankshaft 52. The engine is provided with a crankcase chamber 53 to which a fuel/air charge is introduced by means of an air inlet passageway 54 that communicates with the crankcase chamber 53 by means of a rotary valve 55. The fuel/air which is delivered to the crankcase chamber 53 is transferred to the area above the head of the piston 49 through a transfer or scavenge passage 56 for combustion. During cold starting, this combustion is initiated by means of a glow plug 57 that is supported in the cylinder head of the engine and which is powered in a known manner. The glow plug 57 is continuously operated after the engine has started but at a reduced current so as to prolong the life of the glow plug 57, this being accomplished in a manner to be described.

Referring now specifically to the fuel delivery system, it should be noted that the fuel pressure regulator 35 is comprised of an outer housing 58 that is divided into an atmospheric chamber 59 and a fuel pressure chamber 61 by means of a diaphragm 62. The diaphragm 62 is also biased by means of a spring 63 contained within the atmospheric chamber 59 and operates a valve element 64 so as to maintain a constant gas pressure to a conduit 65. The conduit 65 has positioned within it a solenoid operated valve 66, which is cycled in a manner to be described, so as to provide a variable fuel flow to the engine to maintain the desired constant speed or output of the generator 15. A conduit 67 interconnects the solenoid valve 66 with the intake passageway 54 and it will be noted that there is no throttle valve in the intake passageway 54. Therefore, the speed of the engine 14 is controlled by varying the duty cycle of the solenoid valve 66 in a manner as will be described.

In addition, a further throttle valve 68 is provided in the conduit 67 and is solenoid operated so as to provide further fuel control depending upon the density of the fuel so as to insure against an overly rich mixture under some running conditions. This is primarily operative at low engine speeds so as to control prevent against too rich a mixture being generated in the induction system.

It should also be noted that the fuel pressure regulator 35 maintains a slightly greater than atmospheric fuel pressure.

The lubricant from the reservoir 43 is also discharged into the intake passageway 54 for lubrication of the engine in a known manner.

Figure 4:
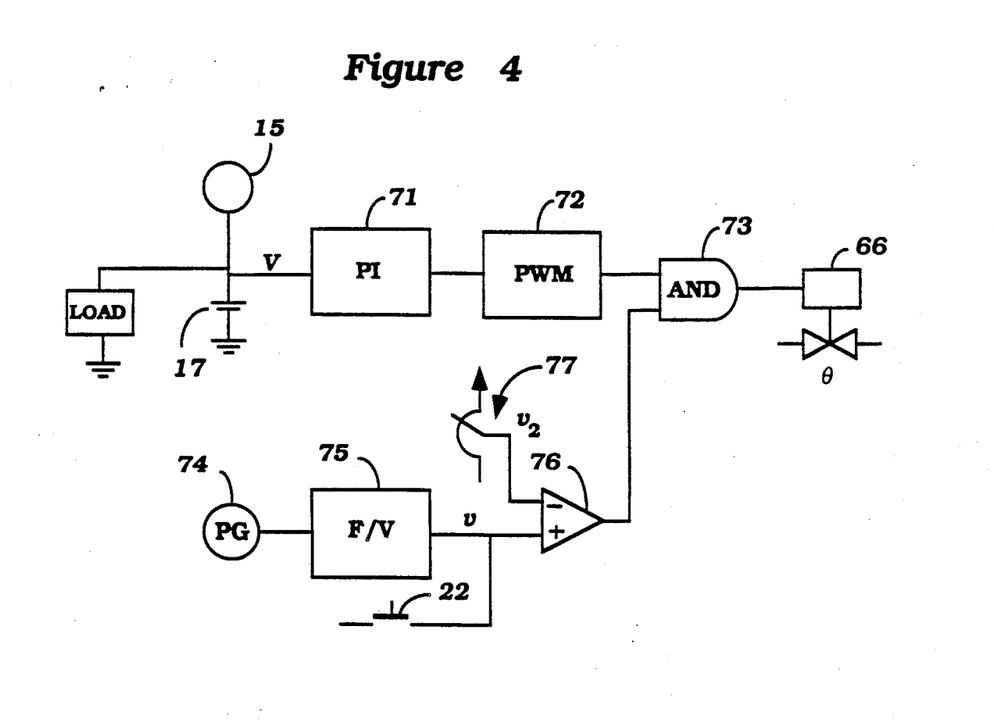
FIG. 4 is a diagrammatic view showing the control circuit for the fuel controlling solenoid.
Figure 5:
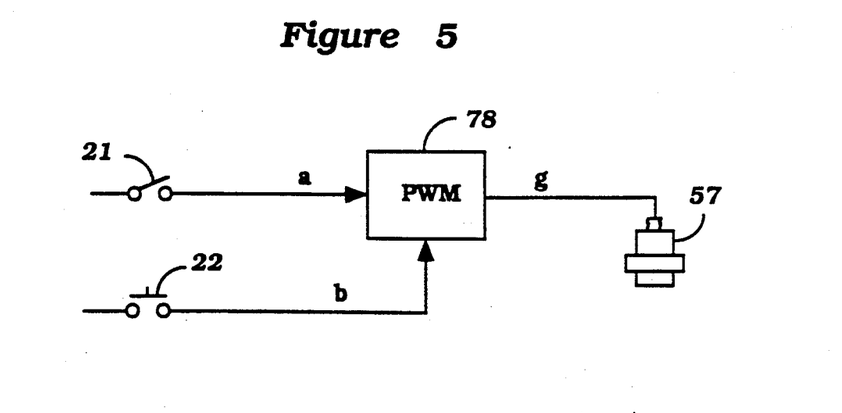
FIG. 5 is a schematic view showing the arrangement for controlling the glow plug.
Figure 6:
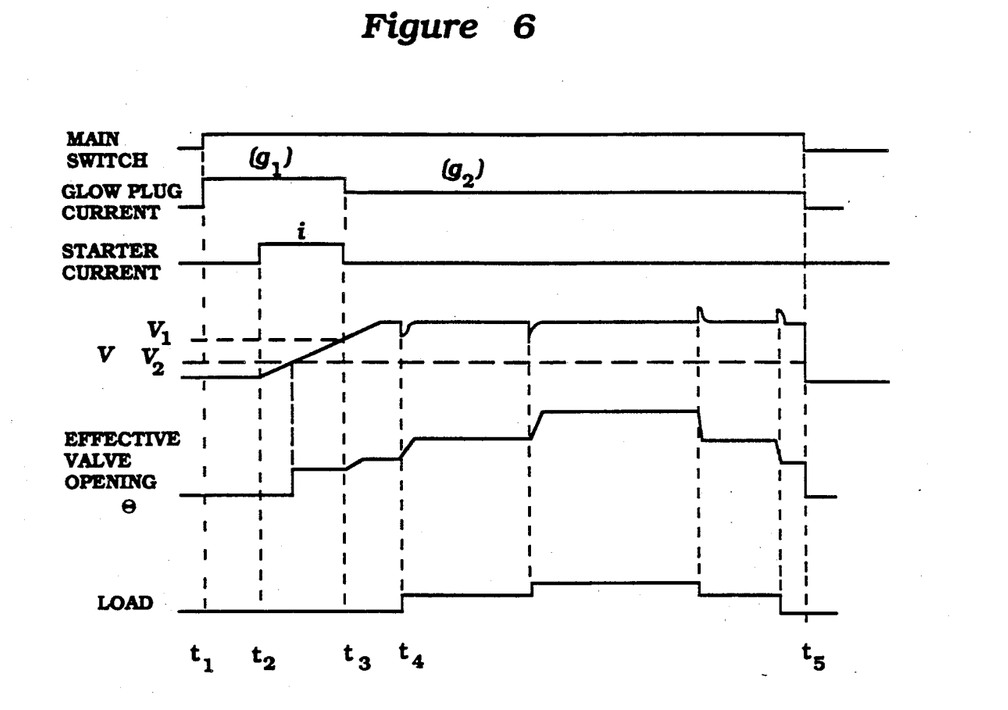
FIG. 6 is a graphical view showing the various control conditions during certain phases of engine operation.
Figure 7:
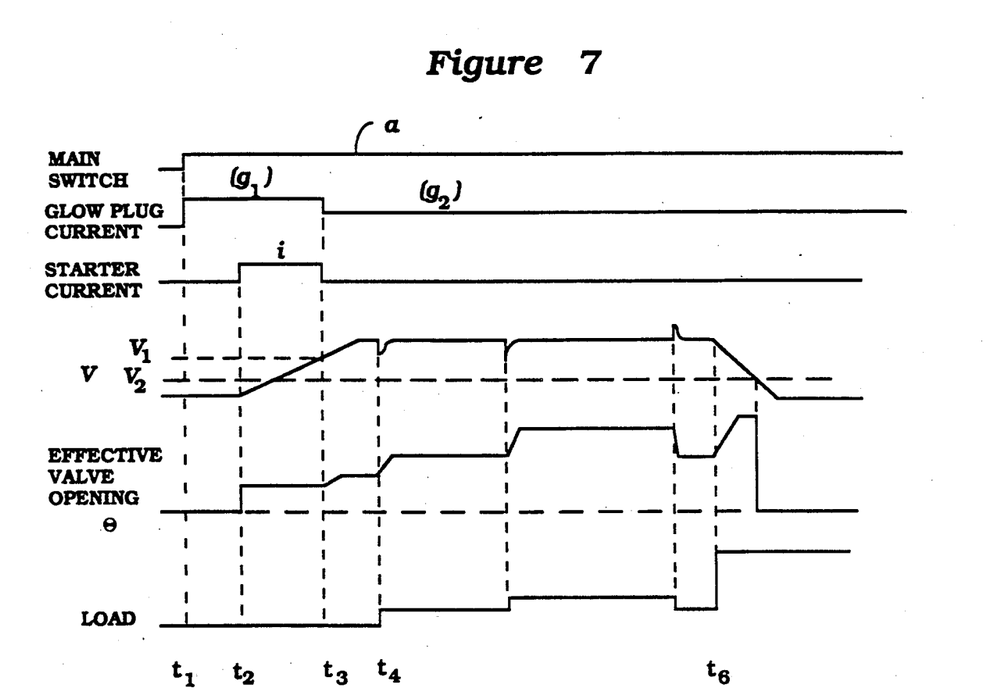
FIG. 7 is a graphical view, in part similar to FIG. 6, and shows other phases of engine operation.

Referring now in detail to FIGS. 4, 6 and 7, the method by which the valve 66 is controlled so as to vary the fuel flow and maintain the desired engine speed and/or output of the generator 15 will be described. In addition, the operation of the starter motor and glow plug 57 will also be described by reference to these FIGS. 5, 6 and 7. The generator 15 produces a voltage V that varies with the load on the circuit. This voltage signal V is inputted to a fuel supply controller 71 that varies the fuel supplied to the engine by outputting a signal to a pulse width modulator 72 that varies the duty cycle of the solenoid 66.

The construction as thus far described, however, will mean that if the engine speed slows below its normal speed and below a speed at which it can continue to run, fuel nevertheless will be supplied to the engine in increasing quantities. Therefore, the device also incorporates an arrangement which insures that this condition cannot prevail. To this end, there is provided in the circuit connecting the pulse width modulator 72 with the solenoid valve 66 and AND gate 73 which must be turned on in order for the pulse width modulation signal from the modulator 72 to operate the valve 66.

The AND gate is switched on and off by a circuit that includes a pulse generator 74 that generates pulses during rotation of the engine output shaft and outputs them to a frequency-to-voltage converter 75 which outputs a voltage signal V indicative of engine speed.

The output voltage V is compared in a comparator 76 with a reference voltage set by a settable device 77. The set voltage signal $v_2$ is a speed normally below that at which the engine can continue to run by itself. As long as the speed of the engine is above this speed, the comparator 75 will be turned on and the AND gate 73 will be conductive so as to permit the control of the solenoid valve 66. If, however, the speed falls below the speed $v_2$, then the AND gate 73 will be shut off and the solenoid valve 63 will be switched off.

Because of the incorporation of the AND gate 73 and the speed control circuit for switching the AND gate on and off, it is also necessary to provide a high voltage signal to the comparator 76 during starting so that the engine will be supplied with starting fuel. For that reason, the starter switch 22 is also in circuit with the plus terminal of the comparator 76 so that when the starter switch 22 is closed, the AND gate 73 will always be conductive.

FIG. 5 shows how the glow plug 57 is operated so as to provide a high power input to it during starting and a lower power input during normal running. To this purpose, the main switch 21 and starter switch 22 are connected to a controller 78 which outputs power to the glow plug 57 so as to operate it. When the output of both the main switch 21 (a) and starter switch 22 (b) are inputted to the controller 78, a high power output $g_1$ will be outputted to the glow plug 51. However, when only the main switch 21 is closed, a lower power $g_2$ will be outputted to the glow plug 57.

Referring now to FIG. 6, the effective valve opening $\theta$ of the solenoid valve 66 is depicted in relation to load and operation of the starter main switch and starter. In addition, the current supplied to the glow plug 57 is also depicted. When the main switch 21 is turned on and the starter switch 22 is energized at the point $t_1$, the main switch current will rise to the on level as shown and the glow plug will be supplied with current at an elevated level $g_1$ so as to provide the necessary heat for starting. After a certain time delay as indicated by the point $t_2$, the current to the starter 15 will be raised to the level i and the engine will be cranked. The cranking speed continues until the speed reaches the speed indicated by the voltage $v_1$ at the point in time $t_3$. At this time, it is determined that the engine is running and the starter, generator 15 then converts to a generator output and the current to the starter is discontinued. At this same time, the glow plug current is reduced to a lower level $g_2$ and the glow plug will be heated at a slower rate. As has been noted, this prolongs the life of the glow plug 57.

When the starter current was energized at the point $t_2$, the valve 66 was then begun on its duty cycle and was opened to the starting condition. When the starter current was discontinued at the point $t_3$, the effective valve opening $\theta$ was continued to increase and will increase until the engine speed reaches it desired speed. This occurs some time after the point $t_3$.

During the engine running, if the load on the engine increases, as at the point $t_4$, the engine will tend to slow down and the voltage signal V will decrease. When this happens, the controller 71 increases the output for the pulse width modulator 72 so as to increase the duty cycle of the solenoid valve 66 so as to maintain the constant engine speed. At subsequent load increases, the same will happen. In a like manner, if the load decreases, the voltage signal V will increase and the duty cycle of the solenoid valve 66 is decreased by the controller 72 so as to maintain speed. At a point when the main switch is turned off $t_5$, the glow current will be discontinued and the valve 66 will be shut off so as to stop the engine.

Under certain circumstances, it may be that the load on the engine is so great that the engine might stall and, at this time with a conventional arrangement, as aforenoted, the fuel flow could continue and cause a problem. FIG. 7 shows another series of conditions that are similar to the conditions of FIG. 5 but, in these conditions, it is noted at the point in time $t_6$ that an abrupt increase in load occurs on the engine which tends to cause it to slow significantly. During the initial phase until the engine speed falls below the speed $v_2$ set by the setting device 77 previously referred to, the fuel supply to the engine will increase. However, as soon as the speed reaches the speed $v_2$, the comparator 76 will cease outputting a signal and the AND gate 73 will be turned off so as to shut off the solenoid valve 66 and discontinue the supply of fuel to the engne. In this way, the loss of fuel under this condition is avoided and the engine will be stopped and must be restarted after the load has been removed.

It should be readily apparent from the foregoing description that the arrangement is very effective in insuring adequate fuel for the engine and also while insuring that fuel will not be inadvertently lost in the event that the engine is shut off or a load which tends to cause stalling of the engine is applied. In addition, the glow plug is supplied with sufficient power to provide adequate heating for starting but the power level to the glow plug is reduced during engine running. Although an embodiment of the invention has been illustrated and described, various changes and modifications may be made without departing from the spirit and scope of the invention, as defined by the appended claims.

We claim:

1. In a fuel supply circuit for a gas powered internal combustion engine comprising a source of pressurized gaseous fuel, conduit means for supplying fuel from said course to said engine, valve means for regulating the amount of fuel supplied to said engine for controlling the speed of said engine without throttling the air flow to said engine and means for deactivating said valve means for discontinuing the supply of fuel from said source to said engine when the speed of said engine falls below a predetermined value.

2. In a fuel supply circuit as set forth in claim 1 wherein the valve means comprised of solenoid operated valve interposed in the conduit means for controlling the amount of fuel supplied to the engine for maintaining a constant engine speed.

3. In a fuel supply circuit as set forth in claim 2 wherein the means for discontinuing the supply of fuel to the engine includes means for shutting off the solenoid valve.

4. In a fuel supply circuit as set forth in claim 1 further including pressure regulating means between the source of pressurized gaseous fuel and the conduit means.

5. In a fuel supply circuit as set forth in claim 4 wherein the valve means comprises a solenoid operated valve means interposed in the conduit means for controlling the amount of fuel supplied to the engine for maintaining a constant engine speed.

6. In a fuel supply circuit as set forth in claim 5 wherein the means for discontinuing the supply of fuel to the engine includes means for shutting off the solenoid valve.

7. In a fuel supply circuit as set forth in claim 6 further including a glow plug for firing a charge in the engine and means for supplying a first higher power to the glow plug during starting and a second lower power to the glow plug during running.

8. In a fuel supply circuit as set forth in claim 1 further including a glow plug for firing a charge in the engine and means for supplying a first higher power to the glow plug during starting and a second lower power to the glow plug during running.

9. In a fuel supply circuit as set forth in claim 1 wherein an electrical generator is driven by the engine and the speed of the engine is determined by the output of the generator.

10. In a fuel supply circuit as set forth claim 2 wherein an electrical generator is driven by the engine and the speed of the engine is determined by the output of the generator.

11. In a fuel supply circuit as set forth claim 7 further including a generator driven by the engine and wherein the running condition of the engine is determined by the output of the generator.

12. In a fuel supply circuit as set forth claim 8 further including a generator driven by the engine and wherein the running condition of the engine is determined by the output of the generator.

13. In an internal combustion engine having a combustion chamber, a glow plug extending into said combustion chamber, a generator driven by said engine, a means responsive to the output of said generator for supplying power to said glow plug at a higher amount during starting and at a lower amount during running as determined by the output of said generator.

14. In an internal combustion engine as set forth in claim 13 wherein the engine is operated by a gaseous fuel.

* * * * *